United States Patent
Suzuki

(10) Patent No.: US 10,509,629 B2
(45) Date of Patent: Dec. 17, 2019

(54) CONTROL DEVICE

(71) Applicants: Kabushiki Kaisha Toshiba, Minato-ku, Tokyo (JP); Toshiba Electronic Devices & Storage Corporation, Minato-ku, Tokyo (JP)

(72) Inventor: Yoshihide Suzuki, Hachioji (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 15/915,738

(22) Filed: Mar. 8, 2018

(65) Prior Publication Data

US 2018/0275962 A1    Sep. 27, 2018

Related U.S. Application Data

(60) Provisional application No. 62/474,742, filed on Mar. 22, 2017.

(51) Int. Cl.
  *G06F 7/50*      (2006.01)
  *G06F 7/523*     (2006.01)
  *G05B 11/42*     (2006.01)

(52) U.S. Cl.
  CPC ............... *G06F 7/50* (2013.01); *G05B 11/42* (2013.01); *G06F 7/523* (2013.01)

(58) Field of Classification Search
  CPC .......... G06F 7/533; G06F 7/523; G05B 11/42
  See application file for complete search history.

(56) References Cited

U.S. PATENT DOCUMENTS

| 2011/0238221 A1* | 9/2011 | Kawazu | G05B 11/42 700/275 |
| 2014/0149024 A1* | 5/2014 | Kim | B60W 10/02 701/113 |
| 2015/0212498 A1* | 7/2015 | Kawai | G05B 11/42 700/42 |
| 2016/0098020 A1* | 4/2016 | Salsbury | G05B 11/42 700/32 |
| 2016/0357161 A1 | 12/2016 | Suzuki | |

FOREIGN PATENT DOCUMENTS

| JP | H07-200067 A | 8/1995 |
| JP | 2001-242903 A | 9/2001 |
| JP | 3554576 A | 5/2004 |
| JP | 3791289 B2 | 6/2006 |
| JP | 2008-282413 A | 11/2008 |

(Continued)

*Primary Examiner* — Tan V Mai
(74) *Attorney, Agent, or Firm* — White & Case LLP

(57) ABSTRACT

A control device according to the present embodiment includes a first circuit, a second circuit and an adder. The first circuit performs proportional control and integral control on the basis of a difference between an indicating value input from an outside and a feedback value output from a controlled object in accordance with the indicating value. The second circuit extracts change in manipulated variable input to the controlled object in accordance with the indicating value and generates and outputs a reverse bias value that causes reverse change to the extracted change. The adder adds an output value of the first circuit to the reverse bias value to output an addition value obtained by the addition as the manipulated variable.

12 Claims, 3 Drawing Sheets

(56) References Cited

FOREIGN PATENT DOCUMENTS

| JP | 4795396 B2 | 10/2011 |
| JP | 2012-141795 A | 7/2012 |
| JP | 2015-87781 A | 5/2015 |
| JP | 5769416 B2 | 8/2015 |
| JP | 2017-4144 A | 1/2017 |

\* cited by examiner

TIME

TIME

CONTROL DEVICE

CROSS-REFERENCE TO RELATED APPLICATIONS

This application is based upon and claims the benefit of priority from U.S. Provisional Application No. 62/474,742 filed on Mar. 22, 2017; the entire contents of which are incorporated herein by reference.

FIELD

Embodiments of the present invention relate to a control device.

BACKGROUND

As examples of feedback control, proportional control and integral control are known. With the proportional control, a deviation between an indicating value input from the outside and a feedback value output from a controlled object in accordance with this indicating value decreases. The proportional control however has a limitation with regard to diminishing this deviation.

Meanwhile, with the integral control, the aforementioned deviation which is difficult to diminish with the proportional control can be further reduced. An manipulated variable input to the controlled object however can go above and below the indicating value in performing the integral control.

DETAILED DESCRIPTION

Embodiments will now be explained with reference to the accompanying drawings. The present invention is not limited to the embodiments.

A control device according to the present embodiment includes a first circuit, a second circuit and an adder. The first circuit performs proportional control and integral control on the basis of a difference between an indicating value input from an outside and a feedback value output from a controlled object in accordance with the indicating value. The second circuit extracts change in manipulated variable input to the controlled object in accordance with the indicating value and generates and outputs a reverse bias value that causes reverse change to the extracted change. The adder adds an output value of the first circuit to the reverse bias value to output an addition value obtained by the addition as the manipulated variable.

Figure 1:
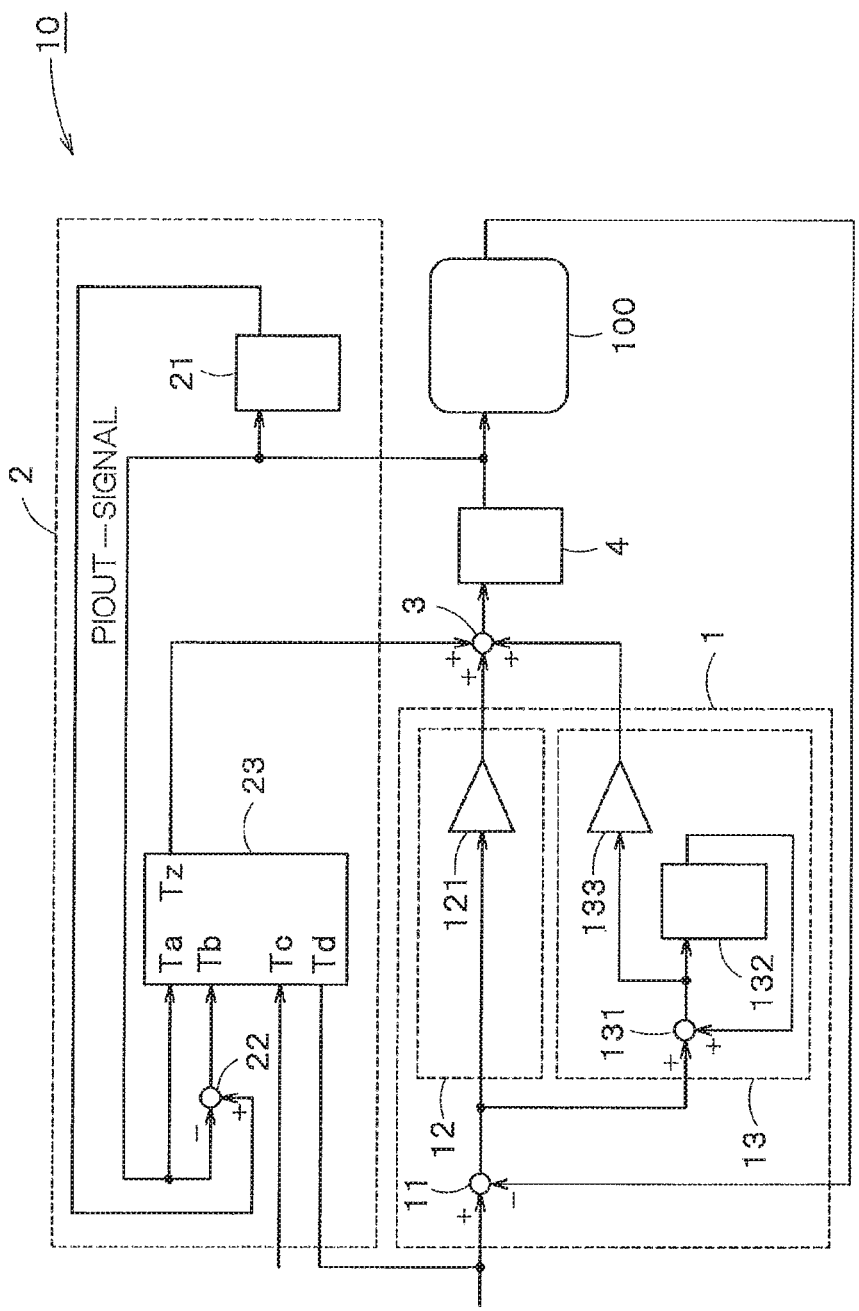
FIG. 1 is a circuit diagram of a control device according to the present embodiment.

FIG. 1 is a circuit diagram of a control device 10 according to the present embodiment. The control device 10 includes a circuit 1, a circuit 2, an adder 3 and a memory circuit 4. This control device 10 performs feedback control of a controlled object 100. As the controlled object 100, for example, a motor is applicable.

The circuit (first circuit) 1 includes a subtractor 11, a proportional control circuit 12 and an integral control circuit 13.

The subtractor 11 calculates a difference between an indicating value input from the outside and a feedback value output from the controlled object 100. The subtractor 11 outputs the calculated difference to the proportional control circuit 12 and the integral control circuit 13.

The proportional control circuit 12 performs proportional control of reducing the difference between the indicating value and the feedback value on the basis of this difference. The proportional control circuit 12 includes a multiplier 121. This multiplier 121 multiplies the difference calculated by the subtractor 11 by a predetermined proportional gain to output the result.

The integral control circuit 13 performs integral control of reducing a residual deviation remaining in the proportional control on the basis of an accumulated value of differences between the indicating values and the feedback values. The integral control circuit 13 includes an adder 131, a memory circuit 132 and a multiplier 133. The adder 131 adds the difference calculated by the subtractor 11 to a value stored in the memory circuit 132. The memory circuit 132 is configured, for example, by using a register. The memory circuit 132 stores an addition value calculated by the adder 131. The multiplier 133 multiplies the addition value calculated by the adder 131 by a predetermined integration gain to output the result. In other words, this addition value is the accumulated value of differences between the indicating values and the feedback values.

The circuit (second circuit) 2 includes a memory circuit 21, a subtractor 22 and a reverse bias circuit 23.

The memory circuit (first memory circuit) 21 is configured, for example, by using a register, and stores an manipulated variable input to the controlled object 100 from the memory circuit 4.

The subtractor 22 subtracts, from a previous manipulated variable (first manipulated variable) stored in the memory circuit 21, a present manipulated variable (second manipulated variable). Namely, the subtractor 22 extracts change in manipulated variable.

The reverse bias circuit 23 generates a reverse bias value that causes reverse change to the change in manipulated variable extracted by the subtractor 22 to output the generated reverse bias value to the adder 3. Hereafter, a configuration of the reverse bias circuit 23 is described with reference to FIG. 2.

Figure 2:
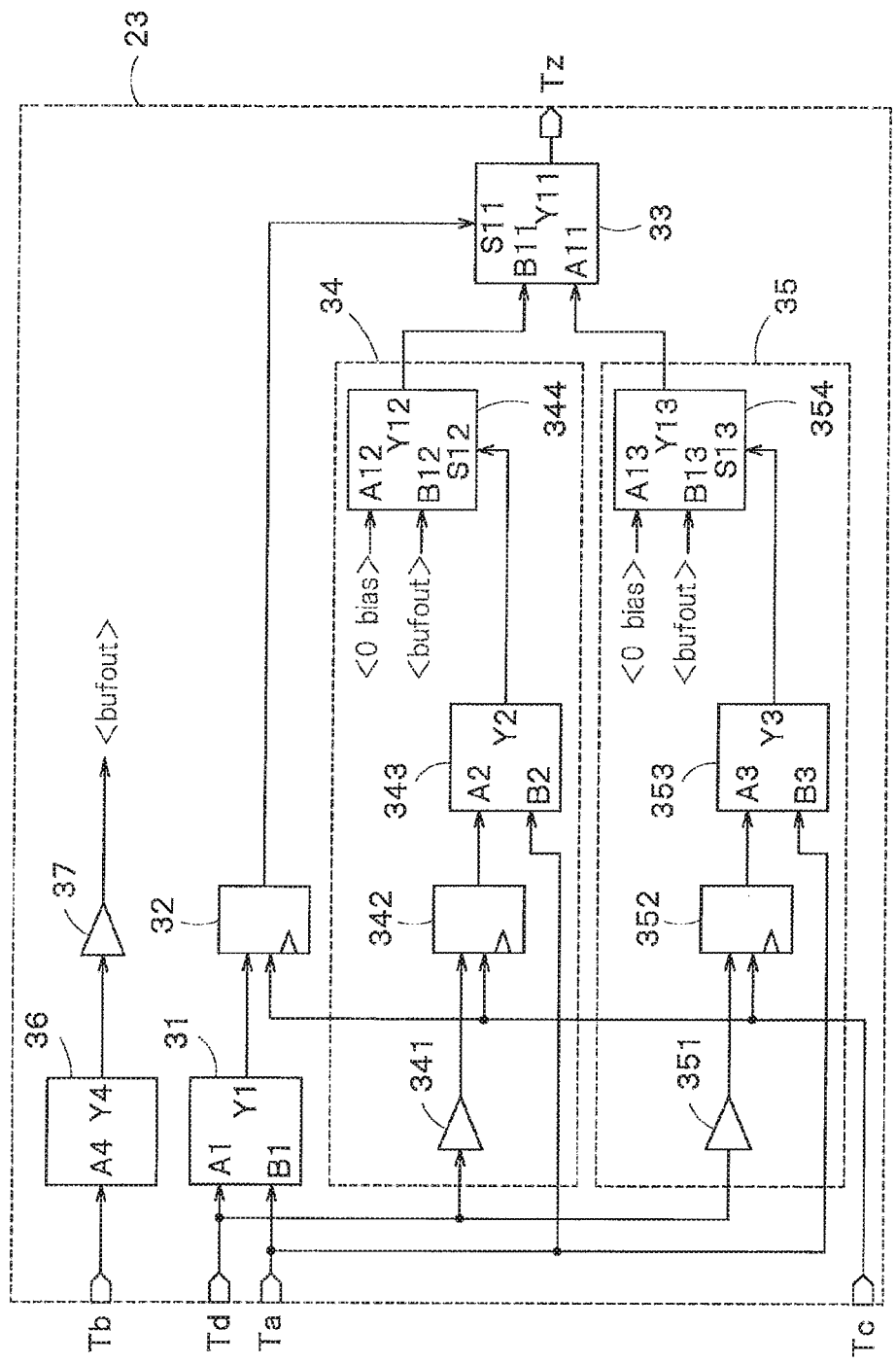
FIG. 2 is a block diagram showing a configuration of a reverse bias circuit.

FIG. 2 is a block diagram showing a configuration of the reverse bias circuit 23. The reverse bias circuit 23 includes a comparator circuit 31, a memory circuit 32, a selector circuit 33, a first reverse bias circuit 34, a second reverse bias circuit 35, a filter circuit 36 and a multiplier 37.

The comparator circuit (first comparator circuit) 31 compares the indicating value input from a terminal Td with the present manipulated variable (second manipulated variable) input from a terminal Ta. The comparator circuit 31 outputs the comparison result to the memory circuit 32. The comparison result of the comparator circuit 31 is output as a selection signal of the selector circuit 33. The comparator circuit 31 detects whether the manipulated variable is smaller or greater than the indicating value. In the case of being smaller, the reverse bias circuit 23 performs control of reducing an overshoot. In the case of being greater, it performs control of reducing an undershoot.

The memory circuit (second memory circuit) 32 is configured, for example, by using a register and stores the output of the comparator circuit 31 in timing when the indicating value changes, in other words, in input timing of a write enable signal input from a terminal Tc.

The selector circuit (first selector circuit) 33 is configured, for example, by using a multiplexer. The selector circuit 33 selects the first reverse bias circuit 34 or the second reverse bias circuit 35 in accordance with the comparison result of the comparator circuit 31 input from the memory circuit 32. A reverse bias value selected by the selector circuit 33 is added by the adder 3.

Specifically, the comparator circuit 31 outputs "0" when the indicating value is greater than the manipulated variable (when an input "A1">an input "B1"). As a result, a selection input "S11" of the selector circuit 33 becomes "0", and the selector circuit 33 selects a signal from the first reverse bias circuit 34. Conversely, the comparator circuit 31 outputs "1" when the indicating value is smaller than the manipulated variable (when the input "A1"<the input "B1"). As a result, the selection input "S" of the selector circuit 33 becomes "1", and the selector circuit 33 selects a signal from the second reverse bias circuit 35.

The first reverse bias circuit 34 outputs a negative reverse bias value when the indicating value is greater than the present manipulated variable. This negative reverse bias value is selected by the selector circuit 33, and thereby, an overshoot is reduced. The first reverse bias circuit 34 includes a multiplier 341, a memory circuit 342, a comparator circuit 343 and a selector circuit 344.

The multiplier (first multiplier) 341 generates a threshold by multiplying the indicating value input from the terminal Td by N (0<N<1). The multiplier 341 outputs this threshold to the memory circuit 342. The multiplier 341 outputs the threshold as a value with which it is determined whether or not the first reverse bias circuit 34 outputs the negative reverse bias value.

The memory circuit (third memory circuit) 342 is configured, for example, by using a register. The memory circuit 342 stores the output of the multiplier 341 in the same timing as the aforementioned memory circuit 32, that is, in the input timing of the write enable signal input from the terminal Tc.

The comparator circuit (second comparator circuit) 343 compares the threshold input from the memory circuit 342 with the manipulated variable. The comparator circuit 343 outputs the comparison result to the selector circuit 344. The comparison result of the comparator circuit 343 is output as a selection signal of the selector circuit 344.

The selector circuit (second selector circuit) 344 is configured, for example, by using a multiplexer. The selector circuit 344 selects the negative reverse bias value or a zero bias value in accordance with the comparison result of the comparator circuit 343.

Specifically, the comparator circuit 343 outputs "1" when the manipulated variable is greater than the threshold (when an input "A2"<an input "B2"). As a result, a selection input "S" of the selector circuit 344 becomes "1", and the selector circuit 344 outputs the negative reverse bias value. Thereby, an overshoot can be suppressed.

Conversely, the comparator circuit 343 outputs "0" when the manipulated variable is smaller than the threshold (when the input "A2">the input "B2"). As a result, the selection input "S" of the selector circuit 344 becomes "0", and the selector circuit 344 outputs the zero bias value. In this case, a rising time of a PIOUT signal corresponding to the manipulated variable is not affected by the aforementioned suppression operation of the overshoot. Therefore, a delay in rising time of the PIOUT signal can be prevented.

The second reverse bias circuit 35 outputs a positive reverse bias value when the indicating value is smaller than the present manipulated variable. The second reverse bias circuit 35 includes a multiplier 351, a memory circuit 352, a comparator circuit 353 and a selector circuit 354.

The multiplier (second multiplier) 351 generates a threshold by multiplying the indicating value by N (N>1). The multiplier 351 outputs this threshold to the memory circuit 352. The multiplier 351 outputs the threshold as a value with which it is determined whether or not the second reverse bias circuit 35 outputs the positive reverse bias value.

The memory circuit (fourth memory circuit) 352 is configured, for example, by using a register. The memory circuit 352 stores the output of the multiplier 351 in the same timing as the aforementioned memory circuits 32 and 342, that is, in the input timing of the write enable signal input from the terminal Tc. With this write enable signal, operations of the memory circuit 32, the memory circuit 342 and the memory circuit 352 synchronize with one another.

The comparator circuit (third comparator circuit) 353 compares the threshold input from the memory circuit 352 with the manipulated variable. The comparator circuit 353 outputs the comparison result to the selector circuit 354. The comparison result of the comparator circuit 353 is output as a selection signal of the selector circuit 354.

The selector circuit (third selector circuit) 354 is configured, for example, by using a multiplexer. The selector circuit 354 selects the positive reverse bias value or a zero bias value in accordance with the comparison result of the comparator circuit 353.

Specifically, the comparator circuit 353 outputs "1" when the manipulated variable is smaller than the threshold (when an input "A3">an input "B3"). As a result, a selection input "S" of the selector circuit 354 becomes "1", and the selector circuit 354 outputs the positive reverse bias value. Thereby, an undershoot can be suppressed.

Conversely, the comparator circuit 353 outputs "0" when the manipulated variable is greater than the threshold (when the input "A3"<the input "B3"). As a result, the selection input "S" of the selector circuit 354 becomes "0", and the selector circuit 354 outputs the zero bias value. In this case, a falling time of the PIOUT signal is not affected by the aforementioned suppression operation of the undershoot. Therefore, a delay in falling time of the PIOUT signal can be prevented.

When a deviation (change in manipulated variable) input from the subtractor 22 (see FIG. 1) via a terminal Tb is greater than a predetermined value (for example, 1%), the filter circuit 36 outputs the deviation to the multiplier 37. Moreover, when the deviation is not more than the predetermined value, the filter circuit 36 outputs a zero bias value to the multiplier 37. Namely, when the feedback value of the controlled object 100 comes close to the indicating value, the filter circuit 36 outputs the zero bias value, and thereby, cancels overshoot suppression operation and undershoot suppression operation. Thereby, oscillation of the PIOUT signal is suppressed.

The multiplier (third multiplier) 37 multiplies the output value of the filter circuit 36. When the deviation calculated by the subtractor 22 is greater than a predetermined value, the multiplier 37 multiplies that deviation output from the filter circuit 36, and outputs the resultant multiplication value to the selector circuits 344 and 354. Namely, this multiplication value corresponds to the reverse bias values selected by the selector circuit 344 and the selector circuit 354.

The adder 3 in FIG. 1 adds the output values of the proportional control circuit 12, the integral control circuit 13 and the reverse bias circuit 23 together. Its addition value is stored in the memory circuit 4. The addition value is output as the manipulated variable of the controlled object 100.

The memory circuit (fifth memory circuit) 4 is configured, for example, by using a register and provided between the adder 3 and the controlled object 100. The memory circuit 4 outputs the addition value of the adder 3 as the manipulated variable to the controlled object 100 in predetermined timing.

Hereafter, operation of the control device 10 according to the present embodiment is described.

First, overshoot suppression operation is described. When an indicating value input to the control device 10 from the outside is greater than an manipulated variable output from the adder 3, a difference arises between the indicating value and a feedback value output from the controlled object 100. Therefore, in the manipulated variable, an output value of the proportional control circuit 12 is predominant. In this stage, since change in manipulated variable is for increase, the feedback value gradually becomes large. When the feedback value comes close to the indicating value, the output value of the proportional control circuit 12 gradually becomes small, and an output value of the integral control circuit 13 gradually become large.

When the manipulated variable is increasing, in the reverse bias circuit 23, the selector circuit 33 selects an output from the first reverse bias circuit 34 on the basis of the comparison result of the comparator circuit 31. Specifically, in the first reverse bias circuit 34, a threshold is set by the multiplier 341 upon input of the indicating value. Until the PIOUT signal exceeds this threshold, the selector circuit 344 selects the zero bias value. Therefore, the adder 3 adds the output values of the proportional control circuit 12 and the integral control circuit 13 together. In this stage, proportional control and integral control are performed, and overshoot suppression operation is not performed.

When the PIOUT signal exceeds the aforementioned threshold, overshoot suppression operation starts. Since the PIOUT signal is rising, the output of the subtractor 22 is a negative value. This negative value is input to the multiplier 37 via the filter circuit 36. The multiplier 37 generates the optimum negative reverse bias value. This negative reverse bias value is input to the adder 3 via the selector circuit 33. In the adder 3, the negative reverse bias value is added to the output values of the proportional control circuit 12 and the integral control circuit 13. Thereby, an overshoot is suppressed.

After that, while the feedback value is coming close to the indicating value, the change in manipulated variable becomes small. Thereby, the deviation calculated by the subtractor 22 of the circuit 2 also becomes small. When this deviation becomes not more than the predetermined value, the filter circuit 36 of the reverse bias circuit 2 outputs the zero bias value. Thus, the overshoot suppression operation ends.

Next, undershoot suppression operation is described. When the indicating value is smaller than the manipulated variable, a difference arises between the indicating value and the feedback value. Therefore, in the manipulated variable, the output value of the proportional control circuit 12 is predominant. In this stage, since change in manipulated variable is for decrease, the feedback value gradually becomes small. When the feedback value comes close to the indicating value, the absolute value of the output value of the proportional control gradually becomes small, and the output value of the integral control circuit 13 also becomes small.

When the manipulated variable is decreasing, in the reverse bias circuit 23, the selector circuit 33 selects the second reverse bias circuit 35 on the basis of the comparison result of the comparator circuit 31. In the second reverse bias circuit 35, a threshold is set by the multiplier 351 upon input of the indicating value. Until the PIOUT signal becomes smaller than this threshold, the selector circuit 354 selects the zero bias value. Therefore, the adder 3 adds the output value of the proportional control circuit 12 and the output value of the integral control circuit 13 together. Namely, proportional control and integral control are performed, and undershoot suppression operation is not performed.

When the PIOUT signal becomes smaller than the aforementioned threshold, undershoot suppression operation starts. In this stage, since the PIOUT signal is falling, the output of the subtractor 22 is a positive value. Similarly to the overshoot suppression operation, this positive value is input to the multiplier 37 via the filter circuit 36, and converted into the optimum positive reverse bias value. This positive reverse bias value is added to the output values of the proportional control circuit 12 and the integral control circuit 13, and thereby, an undershoot is suppressed.

After that, while the feedback value is coming close to the indicating value, the change in manipulated variable becomes small. Thereby, the deviation calculated by the subtractor 22 of the circuit 2 also becomes small. When this deviation becomes not more than the predetermined value, the filter circuit 36 of the reverse bias circuit 2 outputs the zero bias value. Thus, the undershoot suppression operation ends.

Figure 3:
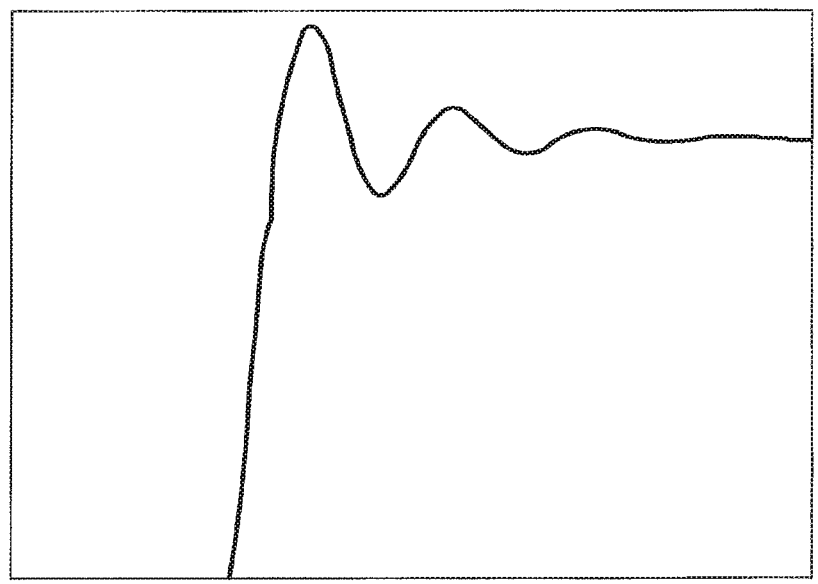
FIG. 3 is a waveform diagram of a PIOUT signal in the case where a circuit 2 is not provided.
Figure 4:
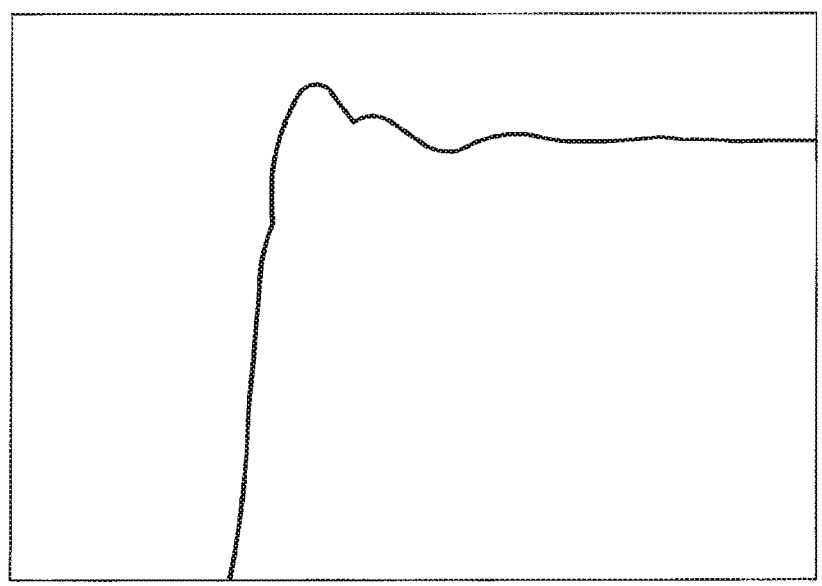
FIG. 4 is a waveform diagram of the PIOUT signal in the case where the circuit 2 is provided.

Hereafter, effects of the control device 10 according to the present embodiment are described with reference to FIG. 3 and FIG. 4. FIG. 3 is a waveform diagram of the PIOUT signal in the case where the circuit 2 is not provided. Meanwhile, FIG. 4 is a waveform diagram of the PIOUT signal in the case where the circuit 2 is provided.

If the circuit 2 is not provided in the control device 10, an overshoot and an undershoot tends to arise while the integral control circuit 13 is performing integral control. As a result, as shown in FIG. 3, ringing of the PIOUT signal tends to be large.

On the other hand, in the case where the circuit 2 is provided in the control device 10 as in the present embodiment, as mentioned above, when the PIOUT signal reaches the vicinity of an overshoot, in other words, when it exceeds the threshold set based on the indicating value, the negative reverse bias value is generated on the basis of change in manipulated variable and added to the outputs of proportional control and integral control. As a result, the PIOUT signal is modified so as to cancel the overshoot.

Moreover, when the PIOUT signal reaches the vicinity of an undershoot, in other words, when it becomes smaller than the threshold, the positive reverse bias value is generated on the basis of change in manipulated variable and added to the outputs of proportional control and integral control. As a result, the PIOUT signal is modified so as to cancel the undershoot.

Since the circuit 2 performs operation of suppressing an overshoot and an undershoot as above, ringing of the PIOUT signal becomes small. Therefore, the output of the controlled object 100 (feedback value) can be made come close to the indicating value quicker.

Furthermore, in the present embodiment, thresholds are set by the multiplier 341 of the first reverse bias circuit 34 and the multiplier 351 of the second reverse bias circuit 35. Thereby, the reverse bias values are generated immediately before timing when an overshoot and an undershoot arise, and supplied to the adder 3. Therefore, the reverse bias values do not affect rising or falling of the PIOUT signal. Accordingly, a delay in slew rate of the PIOUT signal can be prevented.

In addition to the above, when the PIOUT signal is stabilized by the feedback value coming close to the indicating value, output of the reverse bias value from the circuit 2 is stopped by the filter circuit 36. Therefore, oscillation of the PIOUT signal can be prevented.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A control device comprising:
   a first circuit to perform proportional control and integral control, on the basis of a difference between an indicating value input from an outside and a feedback value output from a controlled object in accordance with the indicating value;
   a second circuit to extract change in manipulated variable input to the controlled object in accordance with the indicating value and to generate and output a reverse bias value that causes reverse change to the extracted change; and
   an adder to add an output value of the first circuit to the reverse bias value, and to output an addition value obtained by the addition as the manipulated variable.

2. The control device according to claim 1, wherein the second circuit includes
   a first memory circuit to store the manipulated variable,
   a subtractor to extract a deviation obtained by subtracting, from a first manipulated variable stored in the first memory circuit, a second manipulated variable input to the controlled object subsequent to the first manipulated variable, as the change in manipulated variable, and
   a reverse bias circuit to generate the reverse bias value on the basis of the deviation and to output it to the adder.

3. The control device according to claim 2, wherein the reverse bias circuit includes a first reverse bias circuit to output a negative reverse bias value when the indicating value is greater than the second manipulated variable.

4. The control device according to claim 2, wherein the reverse bias circuit includes a second reverse bias circuit to generate a positive reverse bias value when the indicating value is smaller than the second manipulated variable.

5. The control device according to claim 2, wherein the reverse bias circuit includes
   a first comparator circuit to compare the indicating value with the second manipulated variable,
   a first reverse bias circuit to output a negative reverse bias value,
   a second reverse bias circuit to output a positive reverse bias value, and
   a first selector circuit to select the first reverse bias circuit or the second reverse bias circuit in accordance with a comparison result of the first comparator circuit.

6. The control device according to claim 5, wherein the first reverse bias circuit includes
   a first multiplier to output a threshold obtained by multiplying the indicating value by N ($0<N<1$),
   a second comparator circuit to compare the threshold with the second manipulated variable, and
   a second selector circuit to select an output of the negative reverse bias value or a zero bias value in accordance with a comparison result of the second comparator circuit.

7. The control device according to claim 5, wherein the second reverse bias circuit includes
   a second multiplier to output a threshold obtained by multiplying the indicating value by N ($N>1$),
   a third comparator circuit to compare the threshold with the second manipulated variable, and
   a third selector circuit to select an output of the positive reverse bias value or a zero bias value in accordance with a comparison result of the third comparator circuit.

8. The control device according to claim 5, wherein the reverse bias circuit includes a second memory circuit to store an output of the first comparator circuit in timing when the indicating value changes,
   the first reverse bias circuit includes a third memory circuit to store a threshold obtained by multiplying the indicating value by N ($0<N<1$) in the timing, and
   the second reverse bias circuit includes a fourth memory circuit to store a threshold obtained by multiplying the indicating value by N ($N>1$) in the timing.

9. The control device according to claim 2, wherein the reverse bias circuit includes a filter circuit to output the deviation when the deviation input from the subtractor is greater than a predetermined value and to output a zero bias value when the deviation is not more than the predetermined value.

10. The control device according to claim 9, wherein the reverse bias circuit includes a third multiplier to multiply an output value of the filter circuit and to output a multiplication value obtained by the multiplication as the reverse bias value.

11. The control device according to claim 1, further comprising a fifth memory circuit between the adder and the controlled object and to store the addition value.

12. The control device according to claim 1, wherein
   when the manipulated variable is smaller than the indicating value, the second circuit generates the reverse bias value that performs control of reducing an overshoot, and
   when the manipulated variable is greater than the indicating value, the second circuit generates the reverse bias value that performs control of reducing an undershoot.

* * * * *